United States Patent Office 3,345,309
Patented Oct. 3, 1967

3,345,309
POLYURETHANES PREPARED FROM ORGANIC POLYISOCYANATES AND A HALOARYL ALKYL AMINO ALCOHOL
Rudolf Merten and Gunther Braun, Cologne-Flittard, Germany, assignors to Farbenfabriken Bayer Aktiengesellschaft, Leverkusen, Germany, a German corporation
No Drawing. Filed Feb. 11, 1964, Ser. No. 343,930
Claims priority, application Germany, Feb. 15, 1963, F 39,025, Patent 1,173,649
10 Claims. (Cl. 260—2.5)

This invention relates to polyurethane plastics and more particularly to both nonporous and porous polyurethane plastics having good physical properties and good flame resistance.

It has been proposed heretofore to prepare flame resistant cellular polyurethane plastics by the incorporation of various flame-retardant substances, especially the chemical incorporation of halogen or phosphorous or by the use of flame inhibiting fillers containing halogen, phosphorous or antimony compounds. When sufficient of the heretofore known flame resisting compounds are incorporated, either chemically or as fillers, the mechanical properties of the polyurethane plastics are harmed. This is particularly true where the high degree of flame resistance obtainable with halogen compounds is sought since the halogen compounds impart a high degree of brittleness to the resulting plastics. This is a particularly disadvantageous property where the polyurethanes are prepared in the presence of a blowing agent and with sufficient cross-linking to produce a rigid cellular polyurethane plastic. The rigid cellular polyurethanes containing a high proportion of halogen are often friable and at low densities, indeed quite fragile.

It is therefore an object of this invention to provide polyurethane plastics which contain halogen and are substantially devoid of the foregoing disadvantages. Another object of this invention is to provide cellular polyurethane plastics based on halogen containing polyols which have good flame resistance and good compressive strength. A further object of this invention is to provide substantially rigid cellular polyurethane plastics which have improved mechanical properties and contain sufficient halogen to make them flame resistant. Still another object of this invention is to provide a process for the preparation of polyurethane plastics and an improved halogen containing polyol designed to impart flame resistance and good mechanical properties to the polyurethane plastics.

The foregoing objects and others which will become apparent from the following description are accomplished in accordance with the invention, generally speaking, by providing polyurethanes prepared from organic polyisocyanates and haloaryl alkyl amino alcohols. In accordance with a preferred embodiment of the invention, the haloaryl alkyl amino alcohols are further modified with an alkylene oxide to add alkoxy groups bearing hydroxyl groups on the chain.

Any suitable haloaryl alkyl amino alcohol may be used. These compounds are hereinafter frequently referred to as the haloamino alcohols of the invention. The haloamino alcohols of the invention contain at least one aromatic ring system which has bonded thereto, at least one and preferably more than one halogen atom which is preferably a chlorine or bromine atom. At another place on the ring there is an alkylene and most preferably a methylene radical which links the aromatic ring system to the amino alcohol portion of the molecule. Thus, preferred compounds of the invention could be represented by the formula:

$$[X_n\text{—Ar—R'}]_pR$$

In this formula, X is halogen and preferably chlorine or bromine, $n$ is 1 to 5. Ar is a polyvalent aromatic radical such as phenylene, diphenylene, naphthalene or corresponding tri- or higher valent radicals or the like, $p$ is 1 to 3, R is a p-valent residue obtained by removing $p$ amino hydrogen atoms from $p$ secondary amino groups containing a plurality of free hydroxyl groups and R' is a lower alkylene radical, preferably —CH$_2$—. The haloamino alcohols contain at least two hydroxyl groups and have only tertiary amino groups. They are more or less viscous, light-colored materials which are stable to storage, which possess the combination of halogen components necessary to impart flame resistance and tertiary amino components desirable to accelerate the polyaddition reaction between —NCO groups and active hydrogen containing groups. An advantage of the invention is that the haloamino alcohols are compatible with one another, with the halogenated alkanes used as blowing agents, and with additional active hydrogen containing compounds which may be used, as more particularly set forth below. The haloamino alcohols of the invention may be prepared by reacting haloaralkyl halides with ammonia, hydrazine or polyamines which have at least three hydrogen atoms bonded to amino nitrogen atoms. The amino compounds obtained are then converted to amino alcohols, preferably by reacting the reaction product of the amine and the haloaryl halide with an alkylene oxide. Alternately, amino alcohols within the scope of the invention can be prepared by direct condensation of a haloalkylene halide with an amino alcohol which contains at least two hydroxyl groups and at least one primary or secondary amino group. The reactions using illustrative compounds may be illustrated by the following equations:

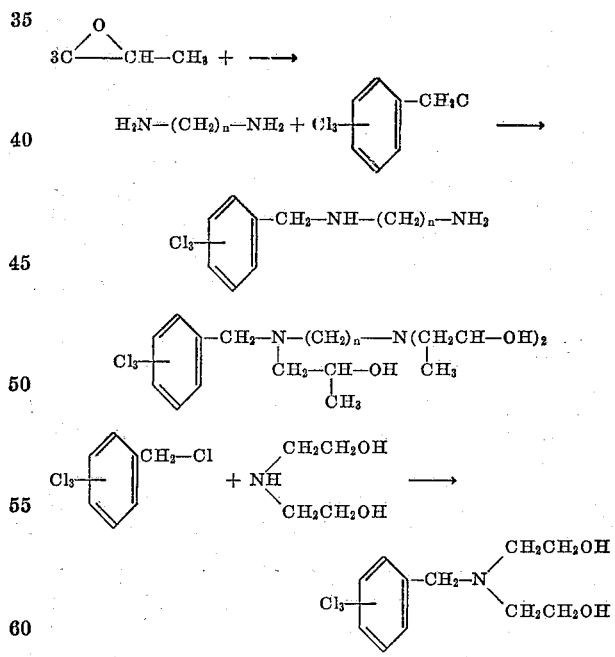

The most preferred compounds of the present invention may be represented by the following generic formula:

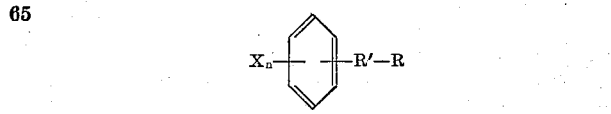

wherein X is either chlorine or bromine, R' is a lower alkylene radical and preferably methylene, ethylene or propylene, n is 1 to 5 and R is one of the following radicals:

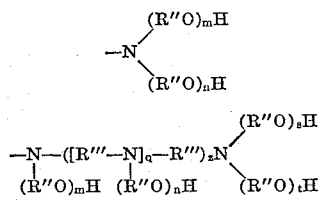

where R'' is a lower alkylene radical having from 2 to 4 carbon atoms such as ethylene, propylene and butylene, $m$, $n$, $s$ and $t$ are integers, preferably sufficient to give the compound a molecular weight within the range of from about 500 to about 10,000, R''' is an organic radical and preferably an alkylene, arylene or heterocyclic radical obtained by removing the primary and secondary amino groups from the polyamine, $q$ is 0 to 4 and $z$ is 0 to 1. The radicals in the foregoing formulae are supported by specific examples of the alkylene oxides, hydrazine and polyamines given below.

Any suitable hydrazine may be used including unsubstituted hydrazine, N-alkyl or N-aryl substituted hydrazine such as, for example, methyl, ethyl, propyl or the like; hydrazine, phenyl hydrazine or the like; unsubstituted hydrazine or the lower alkyl hydrazines are preferred. Any suitable polyamine may be used provided that it has at least three hydrogen atoms bonded to amino nitrogen atoms. Examples of such polyamines include aliphatic, araliphatic, aromatic and heterocyclic polyamines which have at least three hydrogen atoms bonded to amino nitrogen atoms including, for example, ethylene diamine, N-alkyl ethylene diamine such as, for example N-methyl ethylene diamine, N-ethyl ethylene diamine, N-propyl ethylene diamine, diethylene triamine, triethylene tetramine, tetraethylene pentamine, 1,2-diamino propane, 1,3-diamino propane, 1,4-diamino butane, 1,6-diamino hexane; diamines of higher dicarboxylic acids such as the reaction product of one mol of sebacic acid and two mols of ethylene diamine or of two mols of ethylene diamine and one mol of a dimerized fatty acid such as the dimer of ricinoleic acid, the dimer of linoleic acid or the like. It is also possible to use polyamines prepared by the addition of acrylonitrile to a polyhydric alcohol, polyphenol or the like followed by hydrogenation such as, for example, the hydrogenation product of the reaction product of acrylonitrile with ethylene glycol or p,p'-dihydroxy diphenyl or the like. One may also use araliphatic or aromatic amines including, for example, 1,2-, 1,3- or 1,4-xylylene diamine, 1,3-diamino-1-phenyl propane, 1,3-diamino-1,3-diphenyl propane, o-, m- and p-hexahydrophenylene diamine; toluylene diamines such as, for example, 2,4- and 2,6-toluylene diamine, diphenylmethane diamines such as 4,4'-diphenylmethane diamine; naphthalene diamines such as 1,5-naphthalene diamine; hydrogenated diaminodiphenyl methanes such as perhydro-4,4'-diphenylmethane diamine, beta-aminoethyl piperazine as well as the substituted derivatives of these amines including, for example, halophenyl diamines such as 2,2'-dichloro-4,4'-diaminodiphenyl methane, 2-nitro-4,4'-diamino diphenyl methane and the like.

Any suitable haloaralkyl halide in which the halogen is preferably chlorine or bromine may be used. These are preferably aliphatic compounds which contain in the nucleus at least one and preferably two or more chlorine and/or bromine atoms and in each of the side chains which are present on the aliphatic compound they contain one free halogen atom which is preferably chlorine or bromine bonded to an aliphatic carbon atom. Examples of such compounds include 2-, 3-, or 4-chlorobenzyl chloride, 2,6- or 3,4-dichlorobenzyl chloride, commercial trichlorobenzyl chlorides which are mixtures of 2,4,6-; 2,3,6- or the like; trichlorobenzyl chlorides, tetrachlorobenzyl chloride including 2,3,4,6- and 2,3,5,6-tetrachlorobenzyl chloride, pentachlorobenzyl chloride, 2-bromobenzyl bromide, tribromobenzyl chloride such as 2,4,6-tribromobenzyl chloride, nitrochlorobenzyl chloride such as p-nitrochlorobenzyl chloride, ω,ω'-dichlorotetrachloroxylylene, alpha- and beta-halophenylethyl chlorides such as alpha-2,4,6-trichlorophenyl ethyl chloride, chloromethyl chloronaphthalene such as, for example, 1-chloromethyl-5 - chloronaphthalene, chloromethyl bromonaphthalene such as 1-chloromethyl-5-bromonaphthalene, tricresyl phosphites which have been halogenated on the nucleus or side chain such as tri-2-chlorocresyl phosphite and the like.

The amine or haloaralkyl halide are reacted together in such proportions that there is at least one haloaryl group introduced per molecule and so that there are remaining after said introduction at least two hydrogen atoms bonded to amino nitrogen atoms in the molecule. This stage of the reaction may be carried out at any suitable temperature but preferably in the range of from about 50 to about 150° C. in the presence of a base such as excess amines as starting materials, tertiary amines such as triethylene diamine, alkali metal hydroxides such as sodium hydroxide, potassium hydroxide or the like, alkaline earth metal hydroxides such as calcium hydroxide, barium hydroxide or the like, alkali metal carbonates such as sodium carbonate, potassium carbonate or the like. These bases may be added either as solids or as aqueous solutions either during or after the reaction between the halogen and the amine component. It is preferred to avoid excess quantities of strong alkali such as the alcohol metal alcoholates since they generally have to be removed quantitatively. It is also preferred to carry out the reaction between the halogen bearing components and the amine components in concentrated aqueous solutions so that the initial product can be directly reacted with an alkaline oxide without separation of by-products to prepare the haloamino alcohols of the invention. If it is desired to isolate the initial reaction product of the halogen component and the amine component or if the amines contain alcohol groups then the reaction mixture can be concentrated by heating to remove water in a partial vacuum preferably to a temperature of about 50 to 100° C. with removal of the inorganic salts by filtration.

The initial product is then reacted with an alkylene oxide such as, ethylene oxide, 1,2-propylene oxide, 1,2-butylene oxide, butene oxides such as 1,2-epoxy-3,4-butene, styrene oxide, glycidyl ethers such as phenoxy propane oxide, epihalohydrins such as epichlorohydrin and the like. If desired, the crude reaction product of the halogen component and the amine components may be reacted directly with the alkylene oxide in the presence of the water and inorganic salts formed in the first product. The quantity of alkylene oxide used may vary over a wide range depending on the amount of chain extension desired. Where less than one mol of alkylene oxide is used per hydrogen atom bonded to an amino nitrogen atom and capable of being hydroxy alkylated, amino alcohols with both secondary amino hydrogen atoms and hydroxyl groups may be obtained whereas stoichiometric quantities of alkylene oxide lead to the formation of amino alcohols containing both hydroxyl groups and tertiary amino groups. An excess quantity of an alkylene oxide above that required to react with all of the amino nitrogen atoms leads to additional ether groups and a polyether polyol containing tertiary amino groups as well as aromatically bonded halogen groups. The usual catalyst for the reaction of alkylene oxides with active hydrogen containing compounds may be used such as alkali metal alcoholates including sodium phenate and the like. It is preferred to use as a maximum quantity of alkylene oxide that which yields a polyether polyol product having an hydroxyl number of at least 30. The hydroxyl numbers of the polyol products preferably vary between about 30 and about 800.

Still another method of preparing the haloamino alcohols of the invention is to react the haloaralkyl halide with an amino alcohol which initially contains at least two hydroxyl groups and at least one primary or secondary amino group. Examples of such compounds are diethanolamine, 1,2 - propanol amine, diisopropanol amine, N,N,N'-tri-(beta-hydroxy alkyl) alkylene diamines such as N,N,N'-tri-(beta-hydroxy ethyl) ethylene diamine, N,N,N'-tri(beta-hydroxypropyl) ethylene diamine and the like. As in the foregoing, this reaction product may also be reacted with an alkylene oxide as set forth above for the purpose of preparing a chain extended polyether polyol.

The resulting haloamino alcohols of the invention are usually pale yellow to brown, more or less viscous substances, depending on their composition and in accordance with the invention, they are further reacted with organic polyisocyanates to prepare polyurethane plastics including both porous and non-porous polyurethanes as well as elastomers, castings, coatings, foams and the like. It is referred to include a blowing agent to prepare a cellular product. It is often desirable to react the organic polyisocyanate with the haloamino alcohols of the invention and an additional organic compound containing active hydrogen containing groups as determined by the Zerewitinoff method. The haloamine alcohols provided by this invention have excellent miscibility and compatability with other polyhydroxyl compounds and especially the hydroxyl polyesters prepared by reacting a polycarboxylic acid with a polyhydric alcohol as more particularly set forth below, polyhydric polyalkylene ethers prepared by the addition of an alkylene oxide to an initiator including water, polyhydric alcohols, amines and the like as more particularly set forth below, polyhydric polythioethers, polyacetals, adducts of alkylene oxides and polyamines as well as alkoxylated phosphoric acids as disclosed in U.S. Patents 3,061,625 and 3,099,676.

Any suitable compound containing such active hydrogen containing groups may be used including for example linear or branched polyesters of polyester amides prepared by known methods from monofunctional or polyfunctional alcohols such as ethanol, ethylene glycol, propylene glycol, trimethylol propane, glycerine, pentaerythritol and the like; and polycarboxylic acids or hydrocarboxylic acids, such as adipic acid, phthalic acid, ricinoleic acid and the like, if desired with the co-use of amino alcohols, such as ethanol amine, diamines, such as ethylene diamine, hydroxyamines such as diethanol amine or amino carboxylic acids such as alanine and the like may be mentioned as examples of suitable compounds. These polyesters or polyester amides may contain heteroatoms such as oxygen or sulfur, double bonds and triple bonds as well as modifying radicals derived from unsaturated or saturated fatty acids such as oleic acid, or fatty acid alcohols such as lauryl alcohol. Linear polyalkylene glycol ethers of various molecular weights, obtained by polymerizing alkylene oxides such as ethylene oxide, 1,2-propylene oxide, butylene-1,2-oxide, butylene-2,3-oxide styrene oxide, epichlorohydrin, tetrahydrofuran and the like may also be mentioned, in particular those with an hydroxyl group content of 0.5 to 15 percent. Copolymers can also be used. The properties of the final products are often modified to an appreciable degree by the addition thereof.

Linear or branched polyethers obtained by addition of the said alkylene oxides to, for example, polyfunctional alcohols, amino alcohols or amines, are also suitable. Polyfunctional components include ethylene glycol, propylene-1,2-glycol, trimethylol propane, butane-1,2,4-triol, glycerine, castor oil, ethanolamine, diethanolamine, triethanolamine, aniline, alkylene diamines of the type of ethylene diamine, tetramethylene diamine and hexamethylene diamine. It is obvious that mixtures of linear or branched alkylene glycol ethers of different types can also be employed.

These polyalkylene glycol ethers can also be used in admixture with other polyvalent hydroxy compounds, for example, in admixture with butylene-1,4-glycol, trimethylol propane, pentaerythritol, tartaric acid esters, castor oil, polyphosphates prepared by transesterifying a trialkyl phosphite such as tri-beta-chloroethyl phosphite with a polyhydric alcohol such as triethylene glycol and the like. Foaming with the polyalkylene glycol ethers can also be effected in admixture with polyesters.

Polythioethers, phenols reacted with alkylene oxide, formaldehyde resins, hydrogenation products of ethylene-olefin-carbon monoxide copolymers and epoxy resins are also being mentioned as examples of suitable polyhydroxyl compounds.

Any suitable organic polyisocyanate may be used including, for example, n-butylene diisocyanate, hexamethylene diisocyanate, m-xylylene diisocyanate, p-xylylene diisocyanate, 4,4-dimethyl-1,3-xylylene diisocyanate, cyclohexane-1,4-diisocyanate, dicyclohexylmethane-4,4'-diisocyanate, m-phenylene diisocyanate, p-phenylene diisocyanate, 1-alkylbenzene-2,4-diisocyanate, such as 2,4-toluylene diisocyanate, 3-(alpha-isocyanatoethyl)-phenyl isocyanate, 1-alkylbenzene-2,6-diisocyanates, such as 2,6-toluylene diisocyanate, 2,6-diethylbenzene-1,4-diisocyanate, diphenylmethane-4,4'-diisocyanate, dipenyl-dimethyl - methane - 4,4' - diisocyanate, 3,3' - dimethyl - diphenyl-methane-4,4'-diisocyanate and naphthylene-1,5-diisocyanate; trifunctional and polyfunctional polyisocyanates can also be used, for example, toluene-2,4,6-triisocyanate as well as reaction products of, for example, 1 mol of a trihydric alcohol with 3 mols of a diisocyanate and those polyisocyanates which are used, for example, according to German Patents 1,022,789 and 1,027,394.

It is often desirable to use a polyaryl polyalkylene polyisocyanate, such as polyphenyl polymethylene polyisocyanates or, in other words, a mixture of polyisocyanates and the by-products of their manufacture.

Any suitable isocyanate which has not been separated from the by-products of its manufacture, may be used such as, for example, toluylene diisocyanate obtained by the phosgenation of a mixture of toluylene diamines or polyphenyl polymethylene polyisocyanates obtained by the phosgenation of the reaction product of aniline and formaldehyde in the presence of HCl which products contain di-, tri- and higher polyamines. A preferred isocyanate is one having from 26 to about 33 percent free —NCO and an amine equivalent of about 120 to about 150, such as, for example, a product having about 32 percent free —NCO and an amine equivalent of about 140. A specified isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 hours to about 2 hours and then reacting this product with NaOH and separating out the crude amine. About 100 parts of phosgene are then reacted with the amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of about 80 percent 2,4- and 20 percent 2,6-toluylene diisocyanate and the balance polymers incapable of accurate analysis.

The commercially available polyphenyl polymethylene polyisocyanates having an assay of about 95 percent maximum, an amine equivalent of 141 maximum, about 0.04 percent by weight hydrolyzable chloride, about 0.1 to about 0.6 percent by weight total chloride and having a flash point of about 430° F. may be used. As pointed out above, when toluylene diisocyanate, for example, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the diisocyanate is refined and then reconstituted. In this event, it is preferred to have at least 50 percent of the refined isocyanate present. The polyisocyanates disclosed in U.S. Patent 2,950,307 are suitable.

Any suitable catalysts, emulsifiers or blowing agents may be used. Mention may be made, for example, of tertiary amines such as hexahydrodimethyl-aniline, triethylamine, N-ethyl-morpholine, N-methyl-N'-dimethyl-aminoethyl piperazine, triethylene diamine, permethylated diethylene triamine, bis(amino-ethanoladipate), tin salts of carboxylic acids such as stannous octoate, dibutyl tin dilaurate, stannous oleate, iron acetylacetonate, lead naphthenate and 1-aza-bycyclo heptane, dibutyl tin-bis(dimethyl amino caproate) and the like. In addition to water one may use halohydrocarbons including trichlorofluoromethane, dichlorodifluoromethane, or the like as blowing agents as well as saturated and unsaturated hydrocarbons such as alkanes and alkenes specifically hexane, pentane, hexene, pentene and the like, azo compounds and the like. It is preferred to use a foam stabilizer for the production of the cellular polyurethane plastics such as, for example, sulphonated castor oils and sodium salts thereof as well as their salts with alkylene oxides (for example propylene oxide) adducts with hydroxyl (for example ethylene glycol) or amino compounds (for example ethylene diamine). Where polyhydric polyalkylene ethers are included in the reaction mixture to prepare a cellular polyurethane plastic, it is preferred to employ a silicone oil such as that disclosed in U.S. Patent 2,834,743 within the scope of the formula.

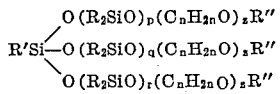

wherein R, R', R" are alkyl radicals having 1 to 4 carbon atoms, $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

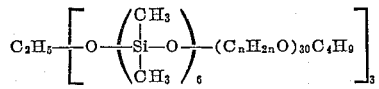

wherein $(C_nH_{2n}O)$ is a mixed polyoxyethylene and oxypropylene block copolymer containing about 17 oxyethylene units and about 13 oxypropylene units. Azohexahydrobenzodinitrile is an example of an azo compound suitable for blowing agents.

It is also possible to prepare other polyurethanes, including elastomers, by the method of U.S. Patent 2,729,618 and coatings, by the method of this invention. The coatings are prepared by mixing the polyisocyanate with the polyols in an inert organic solvent such as benzene, xylene, ethylene glycol diacetate or the like.

The polyurethane plastics of this invention may be used for uses where polyurethanes have been used heretofore. The cellular polyurethane plastics are particularly characterized by good mechanical properties, low brittleness, good adhesion, good pore structure and a low tendency to shrink. The haloamino alcohols show good compatibility and miscibility with other polyhydroxy compounds and other components used in the production of cellular polyurethane plastics, especially the halogenated hydrocarbons referred to above. The products of the invention are preferably rigid cellular poyurethane materials which are especially desirable for building purposes as insulation which may be, for example, sprayed onto the inner walls of a dwelling to provide both thermal and sound insulation.

The invention is further illustrated by the following examples in which parts are by weight unless otherwise specified.

PREPARATION OF THE STARTING MATERIALS

*General instructions*

(a) Halogenoaralkyl halide and (b) alkali are added dropwise to the amine in the reaction vessel at a given reaction temperature and the mixture is then stirred at this temperature for three hours, and alkylene oxide is then added at 100±10° C. After adding alkylene oxide, the temperature is maintained at about 100° C. for about one hour and the mixture is then condensed by evaporation at about 90 to about 100° C./12 mm. Hg and filtered.

The adducts contain less than about 0.2 percent of hydrolyzable chlorine and less than about 0.1 percent of water.

The yields are about 95 percent.

| | Amine | Halogenoaralkylhalide | Alkali | Temp., °C. | Alkylene oxide | Percent OH | Acid No. | Percent Cl | Viscosity, cp./25° C. |
|---|---|---|---|---|---|---|---|---|---|
| A1 | 300 ethylene diamine 90 H₂O. | 1,150 commercial trichlorobenzyl chloride (TCBC).[1] | 198 NaOH in 200 H₂O | 80 | 900 propylene oxide. | 13.3 | 1.2 | 24.7 | 70,0 |
| A2 | 300 ethylene diamine | 1,150 TCBC | 190 NaOH in 200 H₂O, 20 Na₂CO₃ in 100 H₂O. | 130 | do | 11.7 | 2.3 | 24.9 | |
| B | 180 ethylene diamine 54 H₂O. | 690 TCBC | 120 NaOH in 120 H₂O.[2] | 130 | 560 propylene oxide. | 12.1 | 4.5 | 24.2 | |
| C | 300 ethylene diamine 90 H₂O. | 1,720 TCBC | 295 NaOH in 300 H₂O | 80 | 770 propylene oxide. | 12 | 1.2 | 30.4 | 12,060 |
| D | 240 ethylene diamine 60 H₂O. | 1,840 TCBC | 316 NaOH in 350 H₂O | 70 | 504 propylene oxide. | 9.1 | 6.7 | 36.9 | 28,800 |
| E | 120 ethylene diamine | 460 TCBC | 79 NaOH in 100 H₂O | [3] 75 | 224 propylene oxide. | 14.5 | 3.5 | 29.2 | 17,300 |
| F | 232 hexamethylene diamine. | 460 TCBC | 76 NaOH in 80 H₂O, 17 NaHCO in 100 H₂O.[2] | 130 | 360 propylene oxide. | 10.5 | 1.8 | 23.0 | |
| G1 | 320 diethanolamine | 690 TCBC | 118 NaOH in 120 H₂O | 80 | | 12.1 | 3.2 | 36.3 | 6,000 |
| G2 | 51 NH₃ in 500 H₂O | 690 TCBC | 118 NaOH in 120 H₂O | 80 | 270 ethylene oxide. | 12.4 | 1.2 | 35.7 | 5,800 |
| H | 206 diethylene triamine | 920 TCBC | 118 NaOH in 120 H₂O | 70 | 392 propylene oxide. | 8.1 | 2.4 | 34.1 | |
| I | 120 ethylene diamine | 390 3:4-dichlorobenzyl chloride. | 79 NaOH in 80 H₂O | 70 | 500 propylene oxide. | 13.0 | 2.0 | 17.5 | |
| K | 76 NH₃ in 600 H₂O | 920 TCBC | 156 NaOH in 150 H₂O | [4] 50 | 700 propylene oxide. | 14.6 | | 26.9 | |
| L | 60 ethylene diamine | 230 TCBC | 55 KOH in 50 H₂O | 70 | 360 styrene oxide. | 7.8 | 0.6 | 18.6 | |

| | Amine | Halogenoaralkylhalide | Alkali | Temp., °C. | Alkylene oxide | Percent OH | Acid No. | Percent Cl | Viscosity, cp./25° C. |
|---|---|---|---|---|---|---|---|---|---|
| M | 100 hydrazine hydrate | 460 TCBC | 79 NaOH in 100 H₂O | 80 | 490 1-butene oxide. | 14.5 | | 22.6 | 2,470 |
| N | 120 ethylene diamine | 322 2-chlorobenzyl chloride. | 79 NaOH in 100 H₂O | 70 | ___do___ | 12.2 | 0.4 | 9.3 | 17,000 |
| O | 116 hexamethylene diamine. | 196 2,6-dichlorobenzyl chloride. | 39 NaOH in 50 H₂O | 70 | 450 phenoxypropylene oxide. | 8.0 | 2.6 | 10.3 | |
| P | 88 tetramethylene diamine. | 299 pentachlorobenzyl chloride. | 55 KOH in 50 H₂O | 80 | 180 propylene oxide. | 9.9 | 1.0 | 35.3 | |
| Q | 114 hexahydro-p-phenylene diamine. | 313 ω,ω'-2,3,5,6-hexachloro-p-xylene. | 78 NaOH in 100 H₂O | 70 | 350 propylene oxide. | 14.7 | 2.4 | 19.9 | |
| R | 60 ethylene diamine 20 H₂O. | 363 commercial tribromobenzyl chloride. | 39 NaOH in 50 H₂O | 70 | 180 propylene oxide. | 8.9 | 1.9 | 41 | |
| S | ___do___ | 313 beta-chloroethyl pentachlorobenzene. | 39 NaOH in 50 H₂O | 70 | ___do___ | 9.6 | 2.4 | 35 | |

¹ Commercial trichlorobenzyl chloride consisting predominantly of 2,4,5-isomers is used.
² The alkali was added separately dropwise only shortly before the addition of alkylene oxide.
³ Propylene oxide is added dropwise immediately after the addition of TCBC and alkali without an after-heating period.
⁴ Unreacted ammonia was removed in vacuo before the addition of alkylene oxide.

*Starting material T*

About 680 parts of propylene oxide are introduced dropwise into a mixture of about 240 parts of ethylene diamine and about 60 parts of water at about 90° C., the rate at which the propylene oxide is added being adjusted to the addition reaction. About 920 parts trichlorobenzyl chloride and about 158 parts of NaOH in about 200 parts of water are then added dropwise at about 75 to about 80° C. After about four hours at about 80° C., the mixture is concentrated in vacuo and then filtered by suction filtration under pressure to remove the sodium chloride formed. The yield is about 90 percent of the theoretical yield; 12.7 percent OH; acid number 3.8; 25.2 percent Cl.

*Example 1.*—About 50 parts of starting material A2 are thoroughly mixed with about 50 parts of a propoxylated trimethylol propane (OH number 380), about 2 parts of permethylated aminoethylpiperazine and about 0.5 part of polysiloxane-polyalkylene-glycol ester. After the addition of a solution of about 30 parts of fluoro-trichloro-methane in diphenylmethane-4,4'-diisocyanate (90 percent), the mixture is poured into molds in which a flame-resistant hard foam plastic having the following physical properties is produced:

Density _____ kg./m.³__ 33
Compressive strength _____ kg./cm.²__ 2.0
Impact strength _____ kg./cm__ 0.4
Flexural strength under heat _____ ° C__ 115
Water absorption _____ percent__ 3

*Example 2.*—About 100 parts of starting material B are mixed with about 1 part of polysiloxane-polyalkyleneglycol ester. After the addition of a solution of about 50 parts of fluoro-trichloro-methane in about 98 parts of diphenylmethane-4,4'-diisocyanate (90 percent), a fairly active reaction mixture is obtained which, when poured into molds, forms a difficultly inflammable hard foam plastic having the following mechanical properties:

Density _____ kg./m.³__ 22
Compressive strength _____ kg./cm.²__ 1.0
Impact strength _____ kg./cm__ 0.2
Flexural strength under heat _____ ° C__ 120
Water absorption _____ percent__ 2.5

*Example 3.*—About 50 parts of starting material F are thoroughly stirred together with about 50 parts of a polyester of adipic acid, phthalic anhydride, oleic acid and trimethylol propane (OH number 380), about 0.3 part of polysiloxane polyalkylene glycol ester and about 6 parts of sodium castor oil sulphate (50 percent water). After mixing about 134 parts of diphenylmethane-4,4'-diisocyanate (90 percent) into this mixture, a difficultly inflammable, tough hard foam plastic having the following physical properties is obtained:

Density _____ kg./m.³__ 50
Compressive strength _____ kg./cm.²__ 4.1
Impact strength _____ kg./cm__ 0.3
Flexural strength under heat _____ ° C__ 130
Water absorption _____ percent__ 3

*Example 4.*—About 10 parts of starting material G1 are thoroughly stirred together with about 90 parts of a polyether which is slightly branched with trimethylol propane (OH number 42), about 0.3 part of diaza-dicyclooctane, about 0.3 part of tin-dioctoate, about 1 part of polysiloxane-polyalkylene-glycol ester and about 2.7 parts of water. After stirring about 42 parts of a mixture of 80 percent 2,4- and 20 percent 2,6-toluylene diisocyanate into this mixture, a flame-resistant elastic foam plastic having the following mechanical properties is obtained:

Density _____ kg./m.³__ 33
Tensile strength _____ kg./cm.²__ 1.2
Elongation at break _____ percent__ 180
Resistance to compression _____ p./cm.²__ 42
Elasticity _____ percent__ 40
Permanent deformation _____ do____ 9

*Example 5.*—About 21.5 parts of starting material L are diluted with about 20 parts of ethylene glycol-monomethyl-ether acetate and then added to about 55 parts of approximately a 45 percent solution of the reaction product obtained from toluylene diisocyanate (65 percent 2,4- and 35 percent 2,6-isomer), trimethylol propane and butylene-1,3-glycol, which has an isocyanate content of 7.95 percent. When this product is spread over paper or textile fabric, a flame-resistant elastic coating having good solvent resistance is produced. This solvent resistance, for example, to ethylene glycol monomethyl ether acetate, can be improved by after heating for about 2 hours at about 80° C.

In the same way, about 19.1 parts of starting material R, about 17.7 parts of starting material S, about 17.2 parts of starting material P or about 11.5 parts of starting material Q may be used instead of about 21.5 parts of starting material L.

*Example 6.*—About 18.5 parts of starting material D are mixed with about 10.5 parts of naphthylene-1,5-diisocyanate at about 50° C., and the addition product formed in the slightly exothermic reaction is heated for about one hour at about 80° C. to form an elastic, flame-resistant synthetic resin.

*Example 7.*—As in Example 6, about 15 parts of starting material G2 are reacted with about 12.5 parts of diphenylmethane-4,4'-diisocyanate and a similar synthetic resin is obtained.

*Example 8.*—About 50 parts of starting material A1 are thoroughly stirred with about 50 parts of a polyester of adipic acid, phthalic acid anhydride, oleic acid and trimethylol propane (OH number 380), 0.3 part of polysiloxane-polyalkylene-glycol ester and about 6 parts of sodium castor oil sulphate (about 50 percent water). After adding about 146 parts of diphenylmethane-4,4'-diisocyanate (90 percent), the mixture is poured into molds in which a tough, difficultly inflammable, hard foam plastic having the following physical properties is produced:

| | |
|---|---|
| Density _____ kg./m.$^3$__ | 48 |
| Compressive strength _____ kg./cm.$^2$__ | 4.7 |
| Impact strength _____ kg./cm__ | 0.3 |
| Flexural strength under heat _____ ° C__ | 170 |
| Water absorption _____ percent__ | 2 |

*Example 9.*—About 30 parts of starting material C are thoroughly mixed with about 70 parts of a polyester of adipic acid, phthalic acid anhydride, oleic acid and trimethylolpropane (OH number 380), about 10 parts of trichloro-ethylphosphate, about 2 parts of ethyl-morpholine, about 0.3 part of polysiloxane-polyalkylene-glycol ester and about 6 parts of sodium castor oil sulphate (about 50 percent water). After stirring about 139 parts of diphenylmethane-4,4'-diisocyanate (90 percent) into this mixture, a finely porous, flame-resistant, hard foam plastic having the following mechanical properties is obtained:

| | |
|---|---|
| Density _____ kg./m.$^3$__ | 48 |
| Compressive strength _____ kg./cm.$^2$__ | 4.0 |
| Impact strength _____ kg./cm__ | 0.4 |
| Flexural stress under heat _____ ° C__ | 160 |
| Water absorption _____ percent__ | 2.8 |

*Example 10.*—About 50 parts of starting material T are thoroughly stirred with about 50 parts of propoxylated trimethylol propane (OH number 380), about 2 parts of permethylated aminoethyl piperazine and about 0.5 part of polysiloxane-polyalkylene-glycol ester. A solution of about 30 parts of trichlorofluoromethane in about 96 parts of diphenylmethane-4,4'-diisocyanate (90 percent) is added to this mixture which is then poured into molds in which a difficultly inflammable, hard foam plastic having the following physical properties is produced:

| | |
|---|---|
| Density _____ kg./m.$^3$__ | 29 |
| Compressive strength _____ kg./cm.$^2$__ | 2.0 |
| Impact strength _____ kg./cm__ | 0.4 |
| Flexural stress under heat _____ ° C__ | 110 |
| Water absorption _____ percent__ | 1.7 |

*Example 11.*—About 50 parts of starting material H are thoroughly mixed with about 50 parts of propoxylated trimethylol propane (OH number 380), about 1 part of N-ethyl morpholine, about 0.3 part of polysiloxane-polyalkylene glycol ester and about 6 parts of sodium castor oil sulphate (about 50 percent water). After stirring about 125 parts of diphenylmethane-4,4'-diisocyanate (90 percent) into this mixture, a difficultly inflammable, hard foam plastic having the following mechanical properties is obtained:

| | |
|---|---|
| Density _____ kg./m.$^3$__ | 41 |
| Compressive strength _____ kg./cm.$^2$__ | 3.1 |
| Impact strength _____ kg./cm__ | 0.4 |
| Flexural stress under heat _____ ° C__ | 125 |
| Water absorption _____ percent__ | 1.1 |

*Example 12.*—About 50 parts of starting material I are thoroughly stirred with about 50 parts of propoxylated trimethylol propane (OH number 380), about 3 parts of N,N-dimethylbenzylamine and about 0.5 part of polysiloxane polyalkylene glycol ester. After adding a solution of about 30 parts of trichloro-fluoromethane in about 97 parts of diphenylmethane diisocyanate (90 percent), a difficultly inflammable, hard foam plastic having the following properties is obtained:

| | |
|---|---|
| Density _____ kg./m.$^3$__ | 30 |
| Compressive strength _____ kg./cm.$^2$__ | 1.9 |
| Impact strength _____ kg./cm__ | 0.5 |
| Flexural stress under heat _____ ° C__ | 122 |
| Water absorption _____ percent__ | 2.4 |

*Example 13.*—About 50 parts of starting material E are thoroughly mixed with about 50 parts of a polyether (propoxylated trimethylol propane; OH number 380), about 0.3 part of polysiloxane-polyalkylene glycol ester and about 6 parts of sodium castor oil sulphate (about 50 percent water). After adding about 149 parts of diphenylmethane-4,4'-diisocyanate (90 percent) the mixture begins to foam, and a tough hard foam plastic is obtained which is very difficultly inflammable and has the following mechanical properties:

| | |
|---|---|
| Density _____ kg./m.$^3$__ | 4.6 |
| Compressive strength _____ kg./cm.$^2$__ | 3.4 |
| Impact strength _____ kg./cm__ | 0.4 |
| Flexural stress under heat _____ ° C__ | 124 |
| Water absorption _____ percent__ | 3.5 |

*Example 14.*—About 30 parts of the starting material K are thoroughly stirred together with about 70 parts of a polyester of adipic acid, phthalic anhydride, oleic acid and trimethylol propane (OH number 380), about 0.3 part of polysiloxane-polyalkylene-glycol ester and about 60 parts of sodium castor oil sulphate (about 50 percent water). After adding about 145 parts of diphenylmethane-4,4'-diisocyanate (90 percent), the mixture is poured into molds where a flame-resistant hard foam plastic with the following properties is formed:

| | |
|---|---|
| Density _____ kg./m.$^3$__ | 50 |
| Compressive strength _____ kg./cm.$^2$__ | 4.8 |
| Impact strength _____ kg./cm__ | 0.3 |
| Flexural strength under heat _____ ° C__ | 140 |
| Water absorption _____ percent__ | 2.6 |

*Example 15.*—About 50 parts of starting material M are stirred together with about 50 parts of a polyester of adipic acid, phthalic anhydride, oleic acid and trimethylol propane (OH number 380), about 0.3 part of polysiloxane-polyalkylene-glycol ester and about 6 parts of sodium castor oil sulphate (about 50 percent water). After mixing in about 149 parts of diphenylmethane-4,4'-diisocyanate (90 percent), the mixture begins to foam, and a difficultly inflammable hard foam plastic with the following properties is obtained:

| | |
|---|---|
| Density _____ kg./m.$^3$__ | 50 |
| Compressive strength _____ kg./cm.$^2$__ | 4.3 |
| Impact strength _____ kg./cm__ | 0.3 |
| Flexural strength under heat _____ ° C__ | 180 |
| Water absorption _____ percent__ | 2.5 |

*Example 16.*—About 30 parts of starting material N are thoroughly mixed with about 70 parts of polyether (propoxylated trimethylol propane; OH number 380), about 3 parts of N-ethyl morpholine and about 0.5 part of polysiloxane-polyalkylene glycol ester. A solution of about 30 parts of trichlorofluoromethane in about 93 parts of diphenylmethane-4,4'-diisocyanate (90 percent) is added to this mixture. A difficultly inflammable hard foam plastic having the following properties is obtained:

| | |
|---|---|
| Density _____ kg./m$^3$__ | 38 |
| Compressive strength _____ kg./cm$^2$__ | 2.5 |
| Impact strength _____ kg./cm__ | 0.6 |
| Flexural strength under heat _____ ° C__ | 180 |
| Water absorption _____ percent__ | 3.6 |

*Example 17.*—About 70 parts of starting material O are thoroughly mixed with about 30 parts of polyether (propoxylated trimethylol propane; OH number 380), about 1 part of N-methyl morpholine, about 0.3 part of polysiloxane-polyalkylene glycol ester and about 6 parts of sodium castor oil sulphate (about 50 percent water). After the addition of about 118 parts of diphenyl methane-4,4'-diisocyanate (90 percent), a very difficultly inflammable hard foam plastic having the following physical properties is obtained:

| | |
|---|---|
| Density _____ kg./m³ | 41 |
| Compressive strength _____ kg./cm² | 0.9 |
| Impact strength _____ kg./cm | 0.4 |
| Flexural strength under heat _____ °C | 123 |
| Water absorption _____ percent | 3 |

It is to be understood that any other suitable organic polyisocyanate amino alcohol or haloamino alcohol of the invention could have been used in the foregoing working examples provided that the teachings of this disclosure are followed. Moreover, in the working examples when the term, "4,4'-diphenylmethane diisocyanate (90 percent)" is used, a mixture of polyaryl alkylene polyisocyanates obtained by phosgenating the reaction product of aniline with formaldehyde, said mixture of organic polyisocyanates having the formula

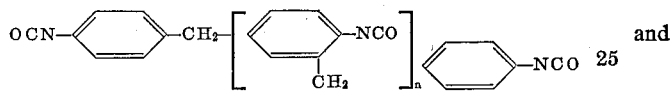

wherein $n$ has an average value of 0.88 and contains about 50 percent diisocyanate and about 21 percent triisocyanate, the balance being tetra- and penta-isocyanates sufficient to give $n$ a value of about 0.88 is intended. Still further, in the foregoing working examples, when the term, "polysiloxane polyalkylene glycol ester" is used, the specific chemical is one having the formula

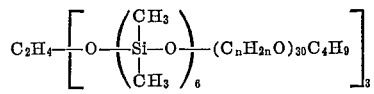

wherein $(C_nH_{2n}O)$ is a mixed polyoxyethylene and oxypropylene block copolymer containing about 17 oxyethylene units and about 13 oxypropylene units.

Although the invention has been described in considerable detail in the foregoing, it is to be understood that such detail is solely for the purpose of illustration and that variations can be made therein by those skilled in the art without departing from the spirit and scope of the invention except as set forth in the claims.

What is claimed is:

1. A polyurethane plastic prepared by a process which comprises reacting an organic polyisocyanate with a haloaryl alkyl amino alcohol having the formula $$[X_n\text{—}Ar\text{—}R']_pR$$

wherein X is slected from the group consisting of chlorine and bromine, $n$ is 2 to 5, Ar is a polyvalent aromatic radical, $p$ is 1 to 3, R is a $p$-valent residue containing at least two free hydroxyl groups and at least one tertiary amino nitrogen atom obtained by removing $p$ hydrogen atoms from $p$ secondary amino groups of an amino alcohol having a plurality of free hydroxyl groups and $p$ secondary amino groups and R' is an alkylene radical.

2. The polyurethane plastic of claim 1 wherein R' is a methylene radical.

3. A cellular polyurethane plastic prepared by a process which comprises reacting, in the presence of a blowing agent, an organic polyisocyanate with a haloaryl alkyl amino alcohol having the formula $$[X_n\text{—}Ar\text{—}R']_pR$$

wherein X is selected from the group consisting of chlorine and bromine, $n$ is 2 to 5, Ar is a polyvalent aromatic radical $p$ is 1 to 3, R is a $p$-valent residue containing at least two free hydroxyl groups and at least one tertiary amino nitrogen atom obtained by removing $p$ hydrogen atoms from $p$ secondary amino groups of an amino alcohol having a plurality of free hydroxyl groups and $p$ secondary amino groups and R' is an alkylene radical.

4. The cellular polyurethane plastic of claim 3 wherein R' is a methylene radical.

5. A polyurethane plastic prepared by a process which comprises reacting an organic polyisocyanate with a haloaryl alkyl amino alcohol having the formula

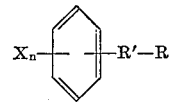

wherein X is selected from the group consisting of chlorine and bromine, $n$ is 2 to 5, R' is a lower alkylene radical and R is selected from the group consisting of

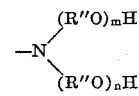

and

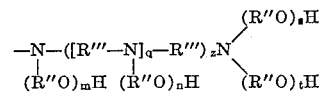

wherein R" is an alkylene radical having from 2 to 4 carbon atoms, $m$, $n$, $s$ and $t$ are integers sufficient to give the compound a molecular weight of from about 500 to about 10,000, R''' is a divalent organic radical obtained by removing the primary and secondary amino groups from an organic polyamine, $q$ is an integer of 0 to 4 and $z$ is 0 to 1.

6. The polyurethane plastic of claim 5 wherein R' is a methylene radical.

7. The polyurethane plastic of claim 6 wherein a blowing agent is included to prepare a cellular polyurethane plastic.

8. The polyurethane plastic of claim 6 wherein R" is a propylene radical.

9. The polyurethane plastic of claim 6 wherein $q$ is 0 and $z$ is 1.

10. A cellular polyurethane plastic prepared by a process which comprises reacting, in the presence of a blowing agent, a polyphenyl polymethylene polyisocyanate with a polyol having the formula

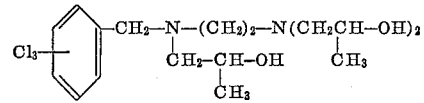

References Cited

UNITED STATES PATENTS

| 3,075,927 | 1/1963 | Lanham | 260—2.5 |
| 3,076,784 | 2/1963 | Schulte-Huermann | 260—47 |
| 3,094,434 | 6/1963 | Chapman et al. | 260—2.5 X |

FOREIGN PATENTS

| 3,274,130 | 9/1966 | Germany. |
| 3,284,377 | 11/1966 | Germany. |

DONALD E. CZAJA, *Primary Examiner.*

LEON J. BERCOVITZ, *Examiner.*

J. J. KLOCKO, G. W. RAUCHFUSS, Jr.,

*Assistant Examiners.*